(12) United States Patent
Barabash et al.

(10) Patent No.: US 9,313,097 B2
(45) Date of Patent: Apr. 12, 2016

(54) OBJECT ORIENTED NETWORKS

(71) Applicant: International Business Machines Corporation, Armonk, NY (US)

(72) Inventors: Katherine Barabash, Haifa (IL); Rami Cohen, Haifa (IL); Liane Lewin-Eytan, Binyamina (IL); Benny Rochwerger, Zichron Yaakov (IL); Yaron Wolfsthal, Biniamina (IL)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 13/741,344

(22) Filed: Jan. 14, 2013

(65) Prior Publication Data
US 2014/0156814 A1 Jun. 5, 2014

Related U.S. Application Data

(63) Continuation of application No. 13/693,216, filed on Dec. 4, 2012.

(51) Int. Cl.
*G06F 15/177* (2006.01)
*H04L 12/24* (2006.01)
*H04L 12/28* (2006.01)
*G06F 9/455* (2006.01)

(52) U.S. Cl.
CPC ........ *H04L 41/0803* (2013.01); *H04L 41/0893* (2013.01)

(58) Field of Classification Search
CPC .............. H04L 29/06; H04L 29/08072; H04L 29/08981
USPC ........................................................ 709/220
See application file for complete search history.

(56) References Cited

U.S. PATENT DOCUMENTS

| | | | |
|---|---|---|---|
| 8,213,336 B2 | 7/2012 | Smith et al. | 370/254 |
| 8,225,313 B2 | 7/2012 | Eshahany et al. | 718/1 |
| 2011/0035494 A1 | 2/2011 | Pandey et al. | 709/224 |
| 2011/0103259 A1 | 5/2011 | Aybay et al. | 370/254 |
| 2011/0110268 A1* | 5/2011 | Panasyuk et al. | 370/254 |
| 2011/0110377 A1 | 5/2011 | Alkhatib et al. | 370/395.53 |
| 2012/0089707 A1 | 4/2012 | Baba et al. | 709/220 |
| 2012/0290695 A1 | 11/2012 | Barabash et al. | 709/223 |
| 2012/0290703 A1 | 11/2012 | Barabash et al. | 709/223 |
| 2012/0291024 A1* | 11/2012 | Barabash et al. | 718/1 |
| 2012/0297384 A1 | 11/2012 | Barabash et al. | 718/1 |
| 2013/0091261 A1 | 4/2013 | Barabash | |

OTHER PUBLICATIONS

U.S. Appl. No. 13/253,338, filed Oct. 2011, Barabash et al.

(Continued)

*Primary Examiner* — Chris Parry
*Assistant Examiner* — Alan S Chou
(74) *Attorney, Agent, or Firm* — Van Leeuwen & Van Leeuwen; Steven L. Bennett

(57) ABSTRACT

An approach is provided in which a system creates a network application model that includes network policy objects and connection rules corresponding to sending data between the network policy objects. The system converts the network application model to network configuration information, which links the network policy objects to the connection rules. In turn, a network control plane is configured based upon the network configuration information to map the network application model to a physical infrastructure.

7 Claims, 14 Drawing Sheets

(56) References Cited

OTHER PUBLICATIONS

Peng Wang et al., "Control information description model and processing mechanism in the trustworthy and controllable network," IFIP/IEEE International Symposium on Integrated Network Management, Jun. 2009, New York, NY, pp. 398-405.

Yang Jian-ren et al., "A service-oriented framework of distributed QOS measurement based on multi-agent for overlay network," International Conference on Communication Software and Networks, Feb. 2009, Chengdu, Sichuan, China, pp. 158-162.

McKeown et al., "OpenFlow: Enabling Innovation in Campus Networks," ACM SIGCOMM Computer Communication Review, vol. 38, No. 2, Apr. 2008, pp. 69-74.

Foster et al., "Frenetic: A Network Programming Language," ICFP '11, The 16th ACM SIGPLAN International Conference on Functional Programming, Sep. 2011, Tokyo, Japan, pp. 279-291.

* cited by examiner

OBJECT ORIENTED NETWORKS

BACKGROUND

The present disclosure relates to modeling a network application based upon network policy objects and configuring a network control plane through network application model translation.

Hardware and software vendors offer platforms that allow a single physical machine to be partitioned into multiple independent network components (e.g., virtual machines). These platforms have become accepted in the industry market on a small business level and on an enterprise level. Network component connectivity may be defined according to application level networking requirements on a virtual basis and/or a physical basis. In some cases, the interconnection definitions may be complex, such as with a virtualized data center using virtualized networking technologies. Virtualized networking technologies bring about complex requirements related to connectivity policies (e.g., compression, quality of service, security, etc.) and managing and controlling the networks, such as managing a large number of endpoints (e.g., virtual machines) over multiple locations, multi-tenant isolation, and supporting dynamic endpoint movement across different physical hosts.

BRIEF SUMMARY

According to one embodiment of the present disclosure, an approach is provided in which a system creates a network application model that includes network policy objects and connection rules corresponding to sending data between the network policy objects. The system converts the network application model to network configuration information, which links the network policy objects to the connection rules. In turn, a network control plane is configured based upon the network configuration information to map the network application model to a physical infrastructure.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
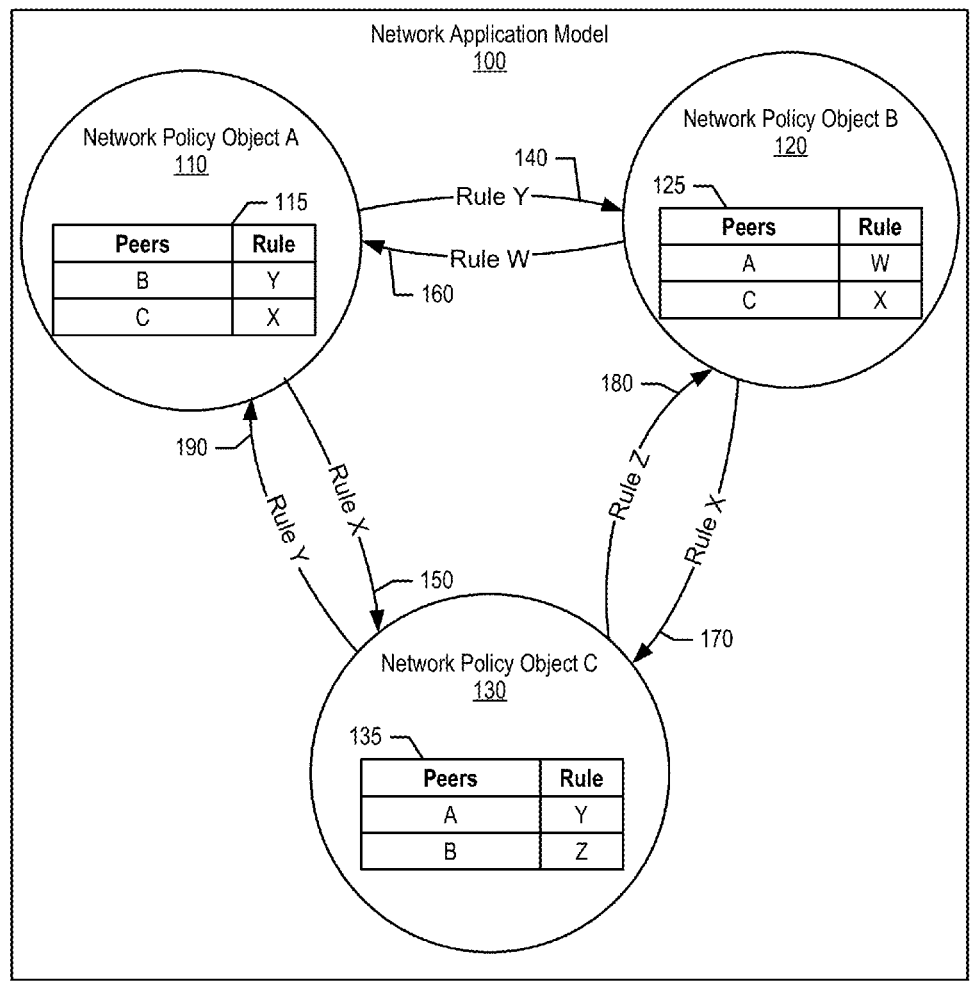
FIG. 1 is a diagram showing a network application model that includes network policy objects and connectivity rules for sending data between the policy objects.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

FIG. 1 is a diagram showing a network application model that includes network policy objects and connectivity rules for sending data between the policy objects. Network application model 100 includes network policy object A 110, network policy object B 120, and network policy object C 130, which are objects defined according to an object-oriented network modeling language and include peers (e.g., other network policy objects) and corresponding connection rules to connect to the peers. Specifying the network application model 100 allows a system administrator to separate the definition/abstraction of the network application model from an underlying physical infrastructure. This separation enables an efficient definition of customized and adaptable network application models, to be automatically configured, deployed and controlled, for example, within virtualized multi-tenant data centers, thus achieving independency from the underlying physical infrastructure.

Network virtualization is described herein as a service provided to communicating computing endpoints, where communication patterns are defined and governed by rules and actions formulated in terms and notions of a logical nature (as opposed to a network defined in terms of cables, ports and network intermediates). As such, a virtual network system may support a large amount of independent isolated tenants and a large amount of network clients in each tenant communicating under tenant specific policies, all the while achieving independence from a physical infrastructure topology implementation.

In one embodiment, a developer uses an object-oriented network modeling language that includes network policy object requirements and primitives. In turn, the developer may create a network application model with network policy objects (based upon the network application requirements) and use the object oriented language primitives to "extend" some of the network policy objects. In this embodiment, the object-oriented network modeling language may include primitives such as "extend," "append," and "override", which an administrator may utilize in order for a network policy object to inherit the peers and add to or override the rules of the inherited network policy object (see FIGS. 2, 6, and corresponding text for further details).

FIG. 1 shows that each of the network policy objects identifies peers (e.g., other network policy objects) and the connection rules to connect to the peers (tables 115, 125, and 135). The connection rules indicate actions/policies for which to take/apply when an endpoint assigned to the network policy object sends data to a destination endpoint corresponding to a particular peer (e.g., rules table 420 shown in FIGS. 4 and 8).

The example shown in FIG. 1 shows that network policy object A 110 defines two rules, one of which corresponds to network policy object B 120 and the other of which corresponds to network policy object C 130. When an administrator assigns an endpoint to a network policy object, the endpoint takes upon itself characteristics of the particular network policy object (see FIGS. 7, 8, and corresponding text for further details). As such, when an endpoint assigned to network policy object A 110 sends data to an endpoint assigned to network policy object B 120, the network control plane provides control instructions that indicate the system should perform an action corresponding to rule Y (rule Y 140), such as data compression. Likewise, when an endpoint assigned to network policy object A 110 sends data to an endpoint assigned to network policy object C 130, the network control plane provides control instructions that indicate the system should perform an action corresponding to rule X (rule X 150).

Referring to network policy object B 120, when an assigned endpoint sends data to an endpoint assigned to network policy object A 110, the network control plane provides control instructions that indicate the system should perform an action corresponding to rule W (rule W 160). And, when the assigned endpoint sends data to an endpoint assigned to network policy object C 130, the network control plane provides control instructions that indicate the system should perform an action corresponding to rule X (rule X 170).

Referring to network policy object C 130, when an assigned endpoint sends data to an endpoint assigned to network policy object A 110, the network control plane provides control instructions that indicate the system should perform an action corresponding to rule Y (rule Y 190). And, when the assigned endpoint sends data to an endpoint assigned to network policy object B 120, the network control plane provides control instructions that indicate the system should perform an action corresponding to rule Z (rule Z 180).

In one embodiment, the list of destination network policy objects may include entities that are not disjoint. For example, a policy domain and an endpoint within the policy domain may both appear as entities in the list of peers. In this example, when an entry specific to the endpoint is included in the list of connection rules, the endpoint specific rule overrides the rule of the containing network policy object when sending data to the endpoint. In other words, the most specific entry of a destination endpoint takes precedence over less specific entries (see FIG. 2 and corresponding text for further details).

Figure 2A:
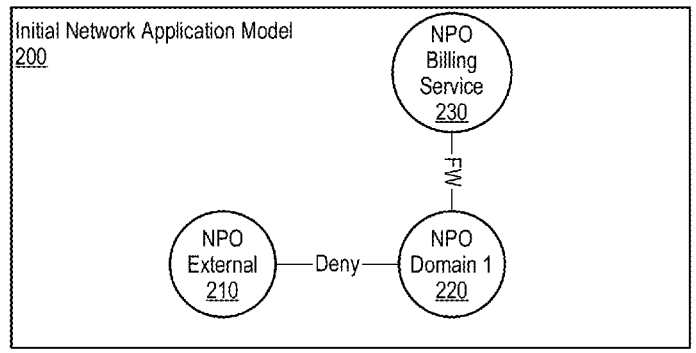
FIGS. 2A-2C are diagrams showing network policy objects extending existing network policy objects using object-oriented network modeling language primitives.
Figure 2B:
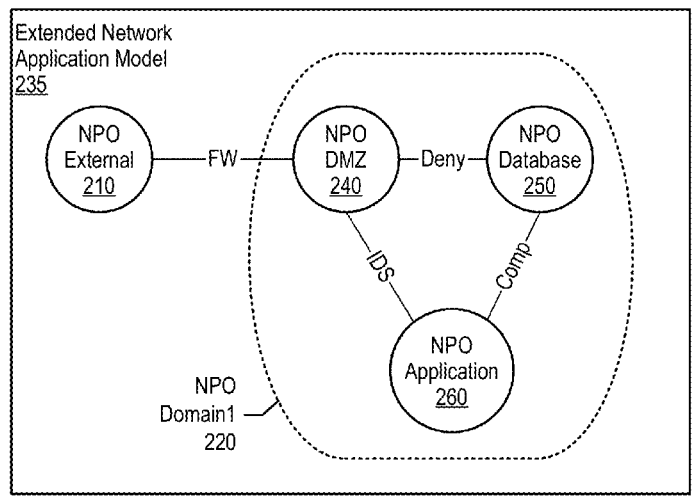
Figure 2C:
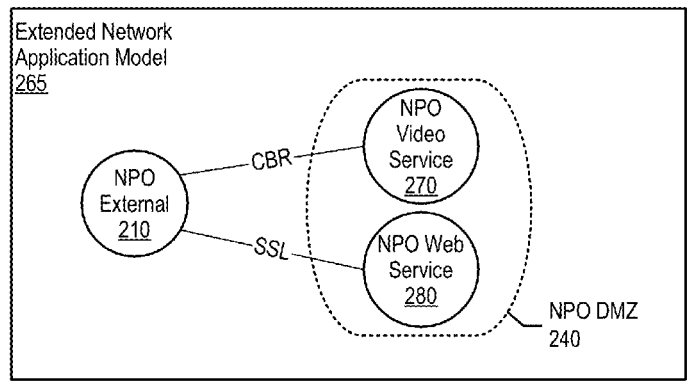

FIGS. 2A-2C are diagrams showing network policy objects extending existing network policy objects. FIG. 2A shows an initial network application model that includes three network policy objects, which are network policy object external 200, network policy object domain 1 210, and network policy object billing service 220. Network policy object domain 1 210 defines two connection rules to interact with the other two network policy objects, which are 1) Forward (FW) data to billing service 220, and 2) deny requests to external entities (network policy object external 200).

FIG. 2B shows network policy object domain 1 210 extended by three other network policy objects, which are network policy object DMZ 230, network policy object database 240, and network policy object application 250. In one embodiment, a developer may create other network policy objects based upon primitives defined in the object-oriented network modeling language that are extensions (children) of an existing network policy object (parent). In this embodiment, a child network policy object takes on the properties of the parent network policy object in terms of peers and corresponding rules.

Figure 6:
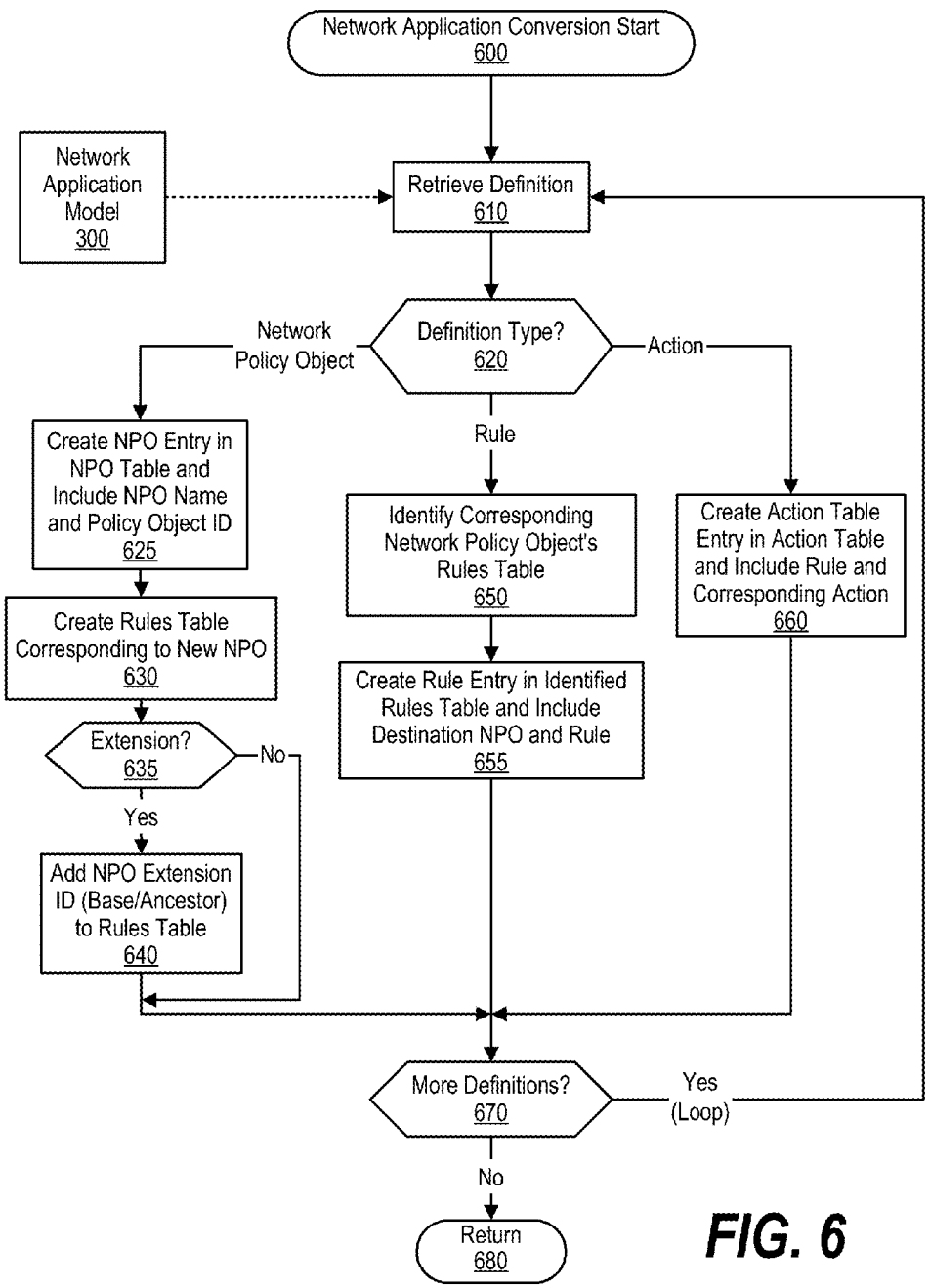
FIG. 6 is flowchart showing steps taken in converting a network application model to configuration information.
Figure 12:
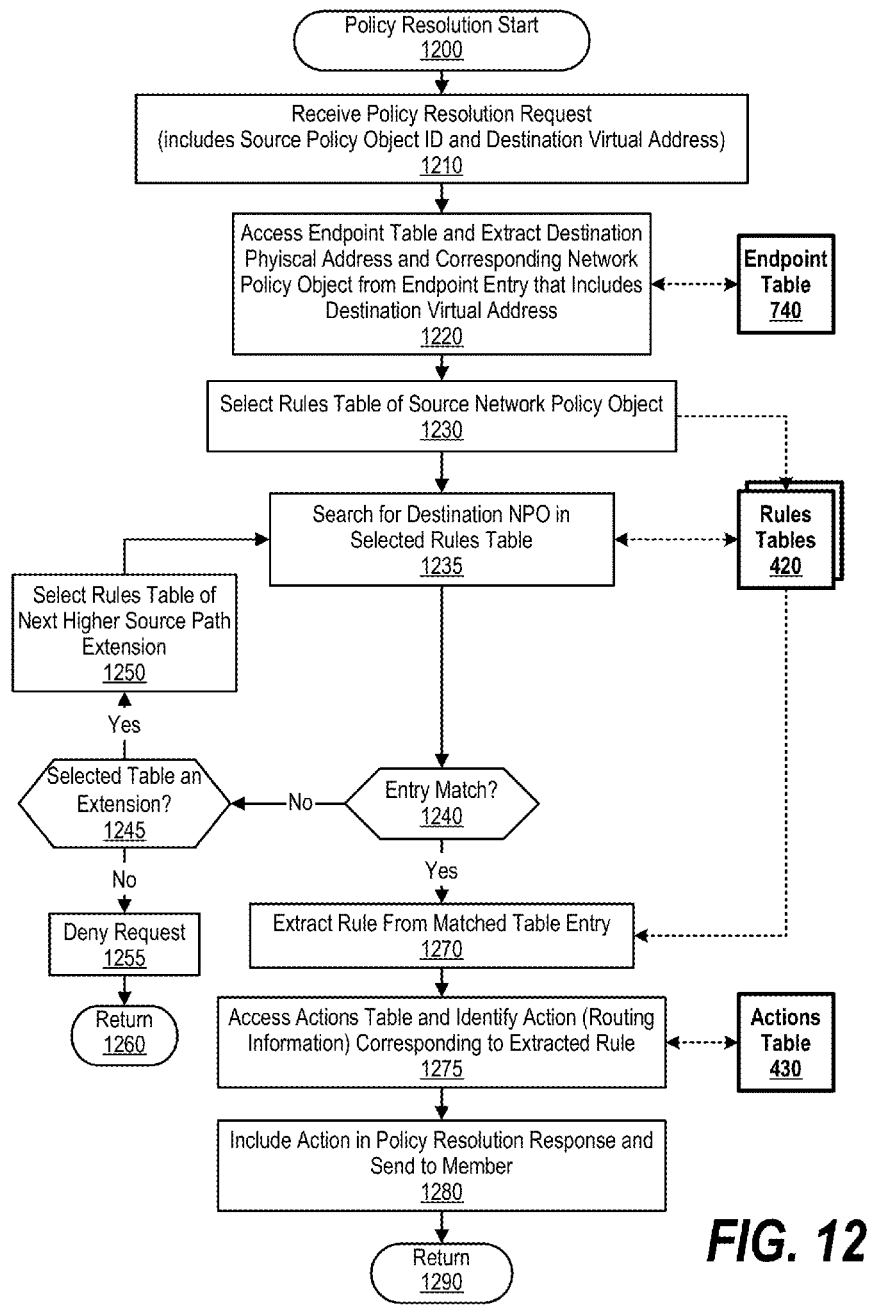
FIG. 12 is a flowchart showing steps taken in resolving a policy resolution request performed by a network control plane.

In addition, the developer may use primitives such as "override" in the child network policy object definition in order for a rule defined at the child network policy object level to override a rule defined at the parent network policy object level for the same peer (see FIGS. 6, 12, and corresponding text for further details). Another primitive the developer may use is "append" to add new peers (and corresponding rules) that do not appear in the parent network policy object. The example in FIG. 2B defines three extension (children) network policy objects of network policy object domain 1 220, which are 1) DMZ/Domain1, 2) Database/Domain1, and 3) Application/Domain1.

Each extended network policy object adds two additional rules (corresponds to an append primitive) to communicate with the other two extended policy objects. For example, network policy object database 250 adds two connection rules of DMZ: deny and Application: compress (e.g., using "append" primitives). In addition, network policy object DMZ 240 adds a rule "Forward" to external 200 that overrides network policy object domain 1 210's rule to network policy object external 210 of "Deny" (from FIG. 2A).

FIG. 2C adds to FIG. 2B and defines two different types of DMZ network policy objects that extend network policy object DMZ/Domain, which are network policy object video service 270, and network policy object web service 280. Each network policy object includes different rules to connect to network policy object external 200, thus overriding network policy object DMZ/Domain 1's previous rule of "Forward" to network policy object external 210. As can be seen, network policy object video service 270 performs CBR to connect to network policy object external 210 and network policy object web service 280 performs SSL to connect to network policy object external 210.

Figure 3:
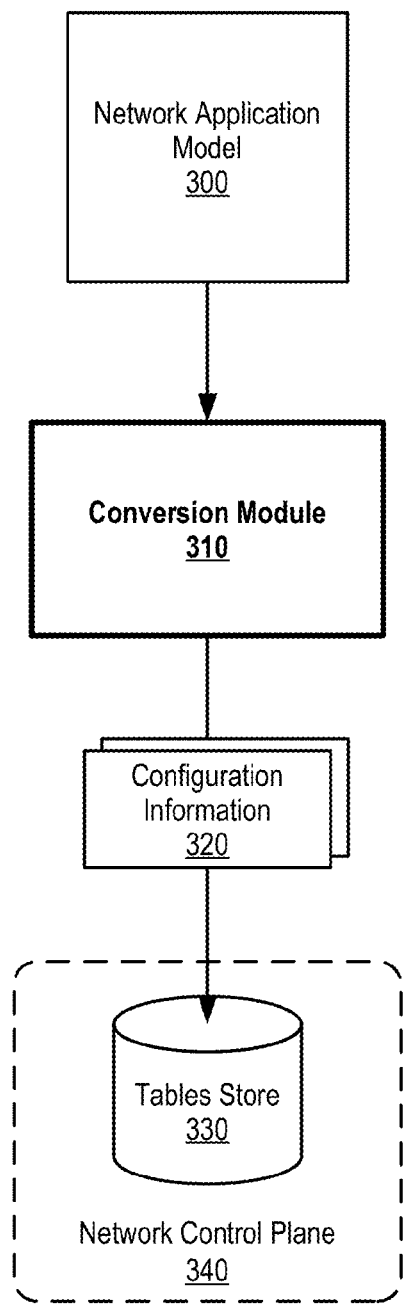
FIG. 3 is a diagram showing a conversion module converting a network application to configuration information to configure a network control plane.

FIG. 3 is a diagram showing a conversion module converting a network application model to configuration information required to configure a network control plane. Network application model 300 includes network policy objects and corresponding connection rules to connect between the network policy objects. Conversion module 310, which may be hardware-based and/or software-based, converts network application model 300 into configuration information that is stored in tables store 330. In one embodiment, configuration information 320 is stored in multiple tables in tables store 330, such as a network policy object table to track the network policy objects; a rules table to match the network policy objects to their corresponding rules; and an actions table that matches the rules to corresponding actions (see FIGS. 4, 8, and corresponding text for further details).

Network control plane 340 is configured according to configuration information 320 and, in turn, after endpoints are assigned to particular network policy objects and start sending data, the policy requests are initiated. In response to the policy requests, network control plane 340 provides policy resolutions based upon the requesting endpoint's assigned network policy object and the destination endpoint's assigned network policy object (see FIGS. 10, 12, and corresponding text for further details).

Figure 4:
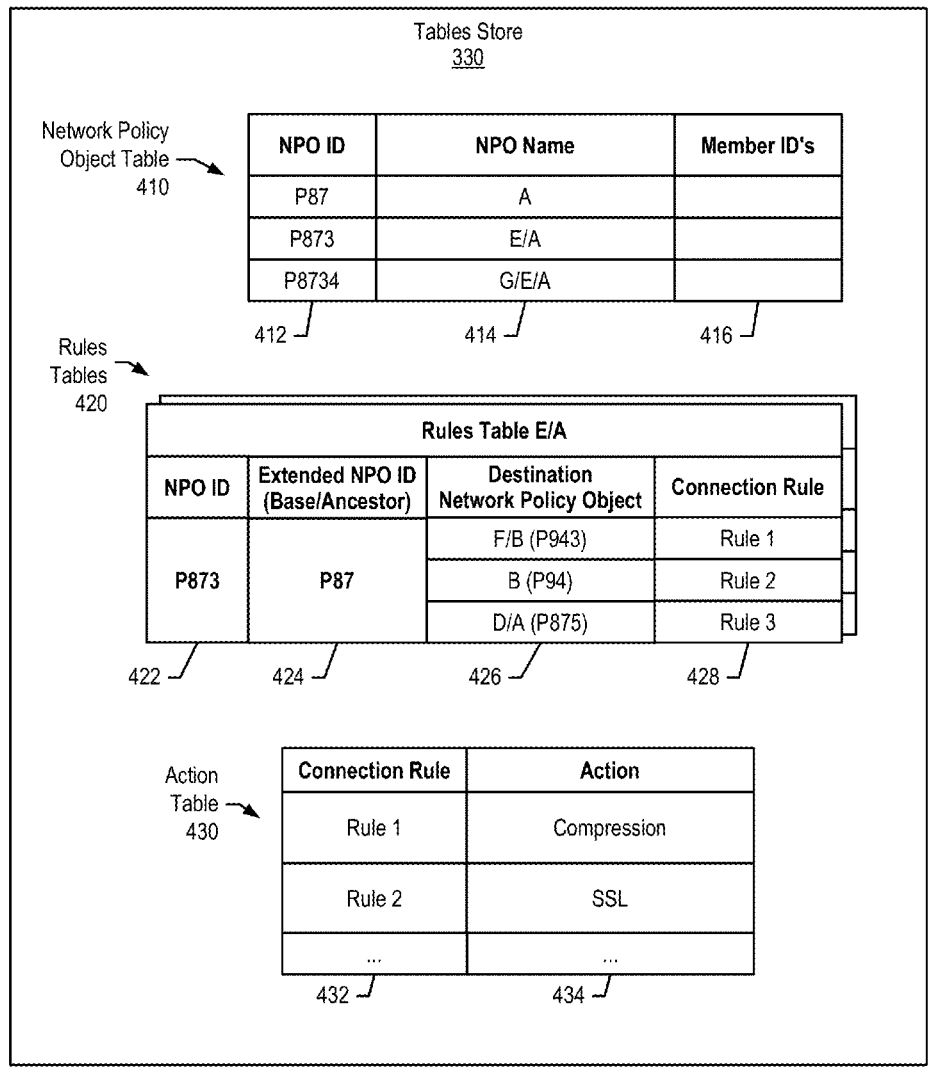
FIG. 4 is a diagram showing various tables that are populated with configuration information generated from converting a network application model.

FIG. 4 is a diagram showing various tables that store configuration information generated from converting a network application model. Tables store 330 includes network policy object table 410, rules table 420, and action table 430. As those skilled in the art can appreciate, tables store 330 may include more or less tables than what is shown in FIG. 4 to store configuration information.

Network policy object table 410 includes entries that define network policy objects. Each entry includes a unique network policy object identifier (column 412), a network policy object name (column 414), and member identifiers (e.g., endpoints) that are assigned to each particular network policy object.

In one embodiment, the network policy object identifier and network policy object name may be characterized by network policy objects from which they extend. For example, network policy object table 410 includes table entries corresponding to network policy objects "A," "E/A," and "G/E/A," which have corresponding network policy object identifiers of P87, P873, and P8734. As those skilled in the art can appreciate, network policy object table 410 may have more or less columns than what is shown in FIG. 4.

Rules tables 420 include a rules table for each individual network policy object. FIG. 4 shows rules table "E/A," which is a rules table that corresponds to network policy object "E/A" and includes destination network policy objects (column 424) and corresponding connection rules (column 428). As such, when receiving a policy request on behalf of endpoint assigned to network policy object E/A, processing accesses rules table E/A to identify a table entry that includes a destination network policy object corresponding to a destination endpoint and, in turn, identify the connection rule to follow in order to send data to the destination endpoint. In other words, rules are searched from "most" specific to "less" specific, so that a search process uses the first entry matching the destination (e.g., when a destination more specific than a policy object) (see FIG. 12 and corresponding text for further details).

Each of rules tables 420 includes the network policy object's unique identifier (column 422) and the identifier of the extended network policy object in case the network policy object is an extension of another network policy object (column 424) (e.g., the base/ancestor network policy object). As can be seen, network policy object E/A's unique identifier is "P873" (from table 410) and is an extension of network policy object A, whose unique identifier is "P87." A distributed policy service uses the network policy object extension identifiers to search rules tables in an upward hierarchical manner to locate an entry that includes the correct destination network policy object, thus identifying a more recent, overriding rule for the desired destination if available (see FIG. 12 and corresponding text for further details).

Actions table 430 includes connection rules (column 432) and corresponding actions (column 434). Processing access actions table 430 subsequent to identifying a rule from rules tables 420 in order to provide the action to a requesting entity. The action may include a connectivity service (IDS, compression, etc) and/or a connectivity policy (QoS, SSL, etc.). In one embodiment, actions table 430 may include an ordered set of policy actions, such as {SSL (Secure Socket Layer), QoS 1 ms latency}, or {IDS (intrusion detection system), Compression}.

Figure 5:
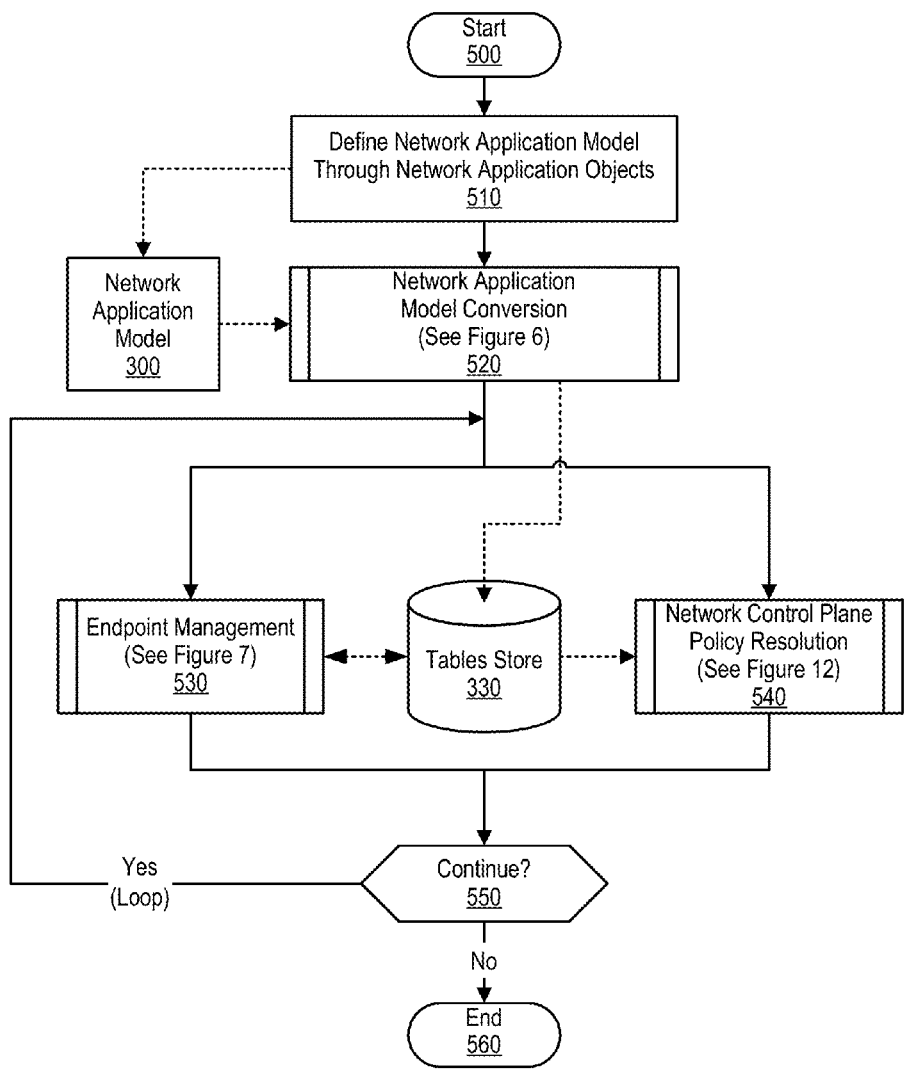
FIG. 5 is a high-level flowchart showing steps taken in defining a network application model based on network policy objects, converting the network application model to configuration information, assigning endpoints to network policy objects, and resolving policy requests to send data between endpoints assigned to various network policy objects.

FIG. 5 is a high-level flowchart showing steps taken in defining a network application model based on network policy objects, converting the network application model to configuration information to configure a network control plane, managing endpoints, and resolving policy requests to send data between endpoints assigned to various network policy objects.

Processing commences at 500, whereupon a developer defines network application model 300 through network policy objects, primitives, and connection rules according to an object-oriented network modeling language. In one embodiment, the network application model is a modeling/specification of the network policy objects and their corresponding connection rules/actions (step 510).

As such, processing converts network application model 300 to configuration information and stores the configuration information in various tables (pre-defined process block 520, see FIG. 6 and corresponding text for further details). A system administrator instantiates endpoints (e.g., virtual machines, subnets, etc.) by assigning the endpoints to network policy objects. Upon endpoint assignment, the system updates the network control plane accordingly, thus creating additional endpoint configuration information in tables store 330 (pre-defined process block 530, see FIG. 7 and corresponding text for further details).

During network operation, the network control plane resolves policy requests received on behalf of endpoints, based upon the configuration information included in tables store 330 (pre-defined process block 540, see FIG. 12 and corresponding text for further details).

A determination is made as to whether to continue at 550 (e.g., whether the network is still valid). If processing should still continue, decision 550 branches to the "Yes" branch, whereupon processing continues to process policy requests and/or manage endpoints. This looping continues until processing should terminate, at which point decision 550 branches to the "No" branch, whereupon processing ends at 560.

In one embodiment, processing may perform other lifecycle events, which may be operational changes such as configuration updates, changes to existing endpoints, migration of endpoints, and/or removing endpoints during operation time.

FIG. 6 is flowchart showing steps taken in converting a network application model to configuration information. Processing commences at 600, whereupon processing retrieves a definition from network application model 300 at step 610. In one embodiment, network application model 315 includes different types of definitions such as a network policy object definition, a connection rule definition, and an action definition.

A determination is made as to the type of the retrieved definition (decision 620). If the definition type is a network policy object definition, decision 620 branches to the "Network Policy Object" branch, whereupon processing creates a network policy object entry in a network policy object table (table 410 shown in FIG. 4) and includes a network policy object name and a unique policy object identifier, which may both be included in the network policy object definition (step 625).

At step 630, processing creates a rules table for the new network policy object. The rules table includes the network policy object's peers (destination network policy objects, virtual machines, subnets, etc. discussed below) and corresponding connection rules that point to actions which to take when an endpoint assigned to the network policy object sends data to a destination endpoint assigned to a particular destination network policy object (e.g., rules table 420 shown in FIG. 4).

A determination is made as to whether the network policy object is an extension of another network policy object (decision 635). For example, a developer may add a primitive to "extend" an existing network policy object and override or add rules corresponding to the existing network policy object. If the network policy object is an extension of another network policy object, decision 635 branches to the "Yes" branch, whereupon processing adds an extended network policy object identifier at step 640 (identifies the extended network policy object) to the rules table (e.g. column 424 in rules table 420). On the other hand, if the network policy object is not an extension of another network policy object, decision 635 branches to the "No" branch, bypassing step 640.

Referring back to decision 620, if the definition type is a rule definition corresponding to a network policy object, decision 620 branches to the "Rule" branch, whereupon processing identifies a rules table corresponding to the network policy object at step 650 (e.g., rules table E/A corresponds to network policy object E/A). At step 655, processing creates a rule entry in the identified rules table and includes a destination (e.g., a "destination" network policy object) and the rule, both of which may be provided in the rule definition (e.g., column 426 and 428 in rules table 420). This step may also be performed to override an existing rule.

Referring back to decision 620, if the definition type is a new action definition, decision 620 branches to the "Action" branch, whereupon processing creates an action entry in an actions table at step 660, which includes a connection rule and corresponding action. In one embodiment, the action may correspond to connectivity service actions or connectivity policies (e.g., action table 430 shown in FIG. 4).

A determination is made as to whether network application model 300 includes more definitions to convert (decision 670). If so, decision 670 branches to the "Yes" branch, which loops back to retrieve and convert another definition. This looping continues until there are no more definitions to process, at which point decision 670 branches to the "No" branch, whereupon processing returns at 680.

Figure 7:
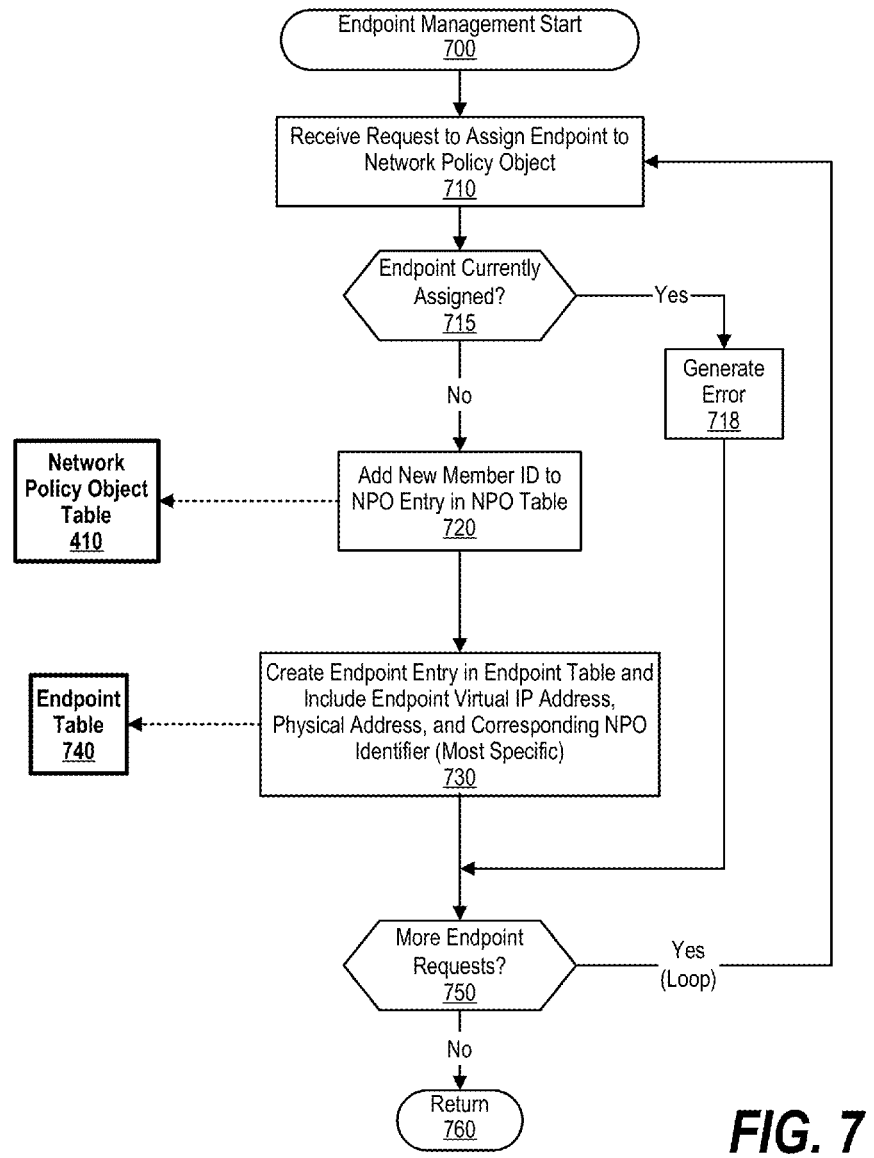
FIG. 7 is a flowchart showing steps taken in instantiating endpoints into a network application model.

FIG. 7 is a flowchart showing steps taken in instantiating endpoints into a network application model. In one embodiment, processing may perform actions other than instantiating the endpoints, such as removing endpoints from a network policy object, migrating endpoints to different network policy objects, re-configuring endpoints, etc.

Processing commences at 700, whereupon processing receives a request to assign an endpoint (e.g., virtual machine) to a network policy object (step 710). A determination is made as to whether the endpoint is currently assigned to a network policy object (decision 715). If the endpoint is currently assigned to a network policy object, decision 715 branches to the "Yes" branch, whereupon processing generates an error at step 718.

On the other hand, if the endpoint is not currently assigned to a network policy object, decision 715 branches to the "No" branch, whereupon processing adds the member's unique identifier to the assigned network policy object's table entry in network policy object table 410 at step 720 (see FIG. 4 and corresponding text for further details).

At step 730, processing creates an endpoint entry in endpoint table 740 at step 720. The endpoint entry includes the endpoint's virtual address, physical address, assigned network policy object identifier, and a unique member identifier (see FIG. 8 and corresponding text for further details).

A determination is made as to whether an administrator wishes to assign more endpoints to network policy objects (decision 750). If so, decision 750 branches to the "Yes" branch, which loops back to receive and process another endpoint assignment request. This looping continues until there are no more endpoint assignment requests to process, at which point decision 750 branches to the "No" branch, whereupon processing returns at 760.

Figure 8:
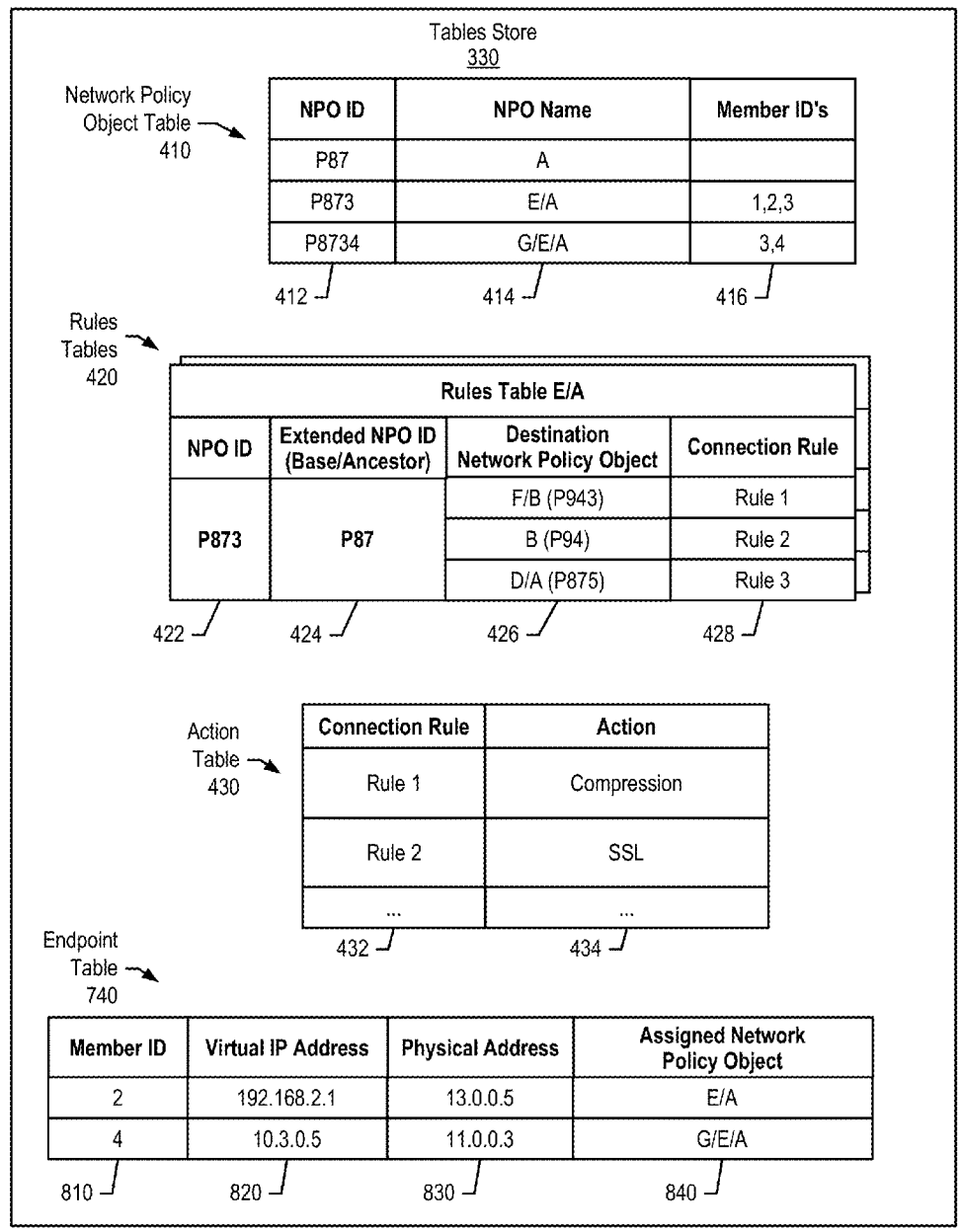
FIG. 8 is a diagram showing various tables of the control plane utilized to configure a network application model and store control information following instantiation of endpoints into the network application model.

FIG. 8 is a diagram showing various tables utilized by the network control plane to configure a network application model and instantiate endpoints into the network application model. FIG. 8 is similar to FIG. 4 with the exception that FIG. 8 includes endpoint table 740 and network policy object table 410's column 416 populated with member identifiers (e.g., endpoints assigned to various network policy objects).

Endpoint table 740 includes a list of endpoints (e.g., virtual machines) and their assigned network policy object. Endpoints may be referred to as "members" and have a unique member identifier (column 810) similar to that shown in column 416 of network policy object table 410. Each entry includes the endpoint's virtual IP address (column 820) and physical address (column 830). Column 840 shows the network policy object assigned to each particular endpoint. As such, when receiving a policy request, a policy service/controller accesses endpoint table 440 to match a destination endpoint (via virtual IP address in column 820) to their corresponding assigned network policy object in column 840 (see FIG. 12 and corresponding text for further details).

Figure 9:
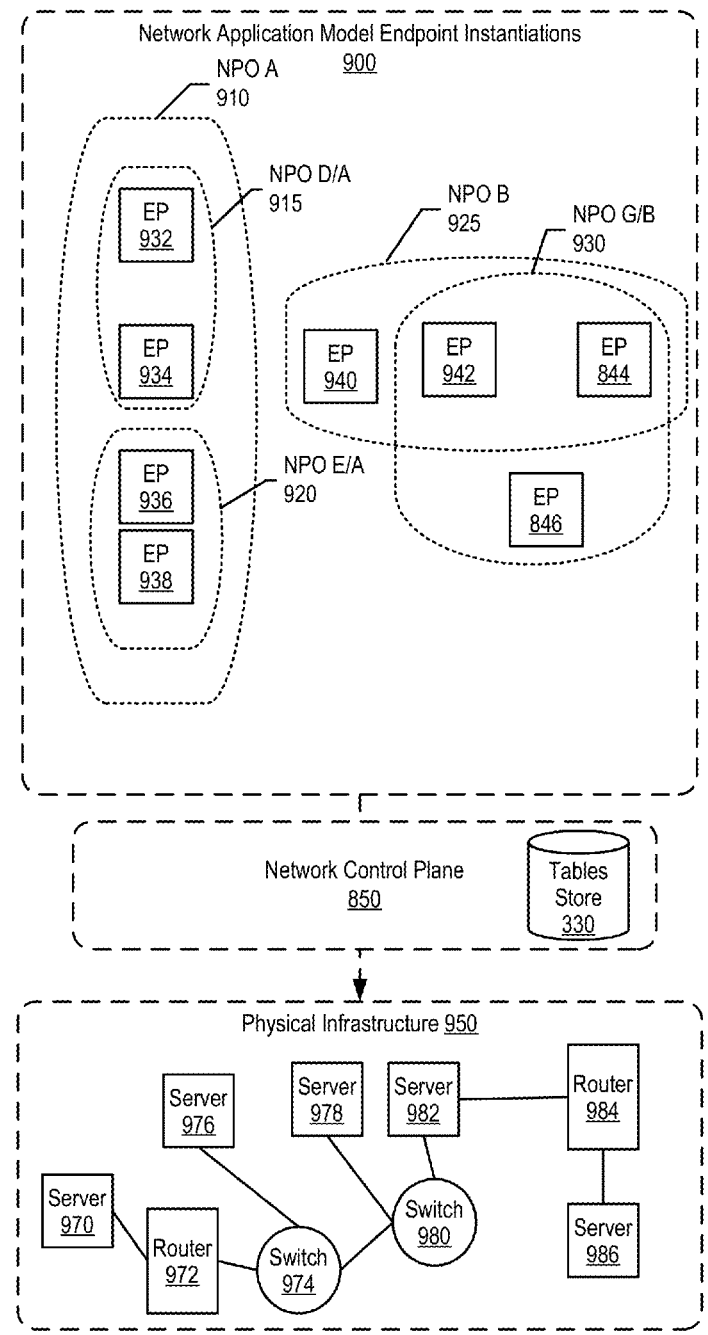
FIG. 9 is a diagram showing instantiation of endpoints within a network application model and their corresponding mapping to a physical infrastructure.

FIG. 9 is a diagram showing the instantiation of endpoints within a network application model and their corresponding mapping to a physical infrastructure and, as such, the mapping control information is stored within a network control plane. Network application model endpoint instantiations 900 include endpoints 932-946, which are assigned to one of network policy objects 910-930.

Network control plane 850 utilizes configuration information stored in tables store 330 to provide resolution responses to endpoints 932-946 (or a corresponding virtual switch), which allow the endpoints to send data between each other over physical infrastructure 950. As can be seen, physical infrastructure 950 may include multiple servers (970, 976, 978, 982, and 986), multiple switches (974, 980), and multiple routers (972, 984) that create multiple subnets.

In one embodiment, virtual network abstractions support address independence between different virtual networks. For example, two different endpoints operating in two different virtual networks may have the same IP address. As another example, the virtual network abstractions support deploying endpoints, which belong to the same virtual networks, onto different hosts that are located in different physical subnets (includes switches and/or routers between the physical entities). In another embodiment, endpoints belonging to different virtual networks may be hosted on the same physical host. In yet another embodiment, the virtual network abstractions support endpoint migration anywhere in a data center without changing the endpoint's network address and losing its network connection.

Figure 10:
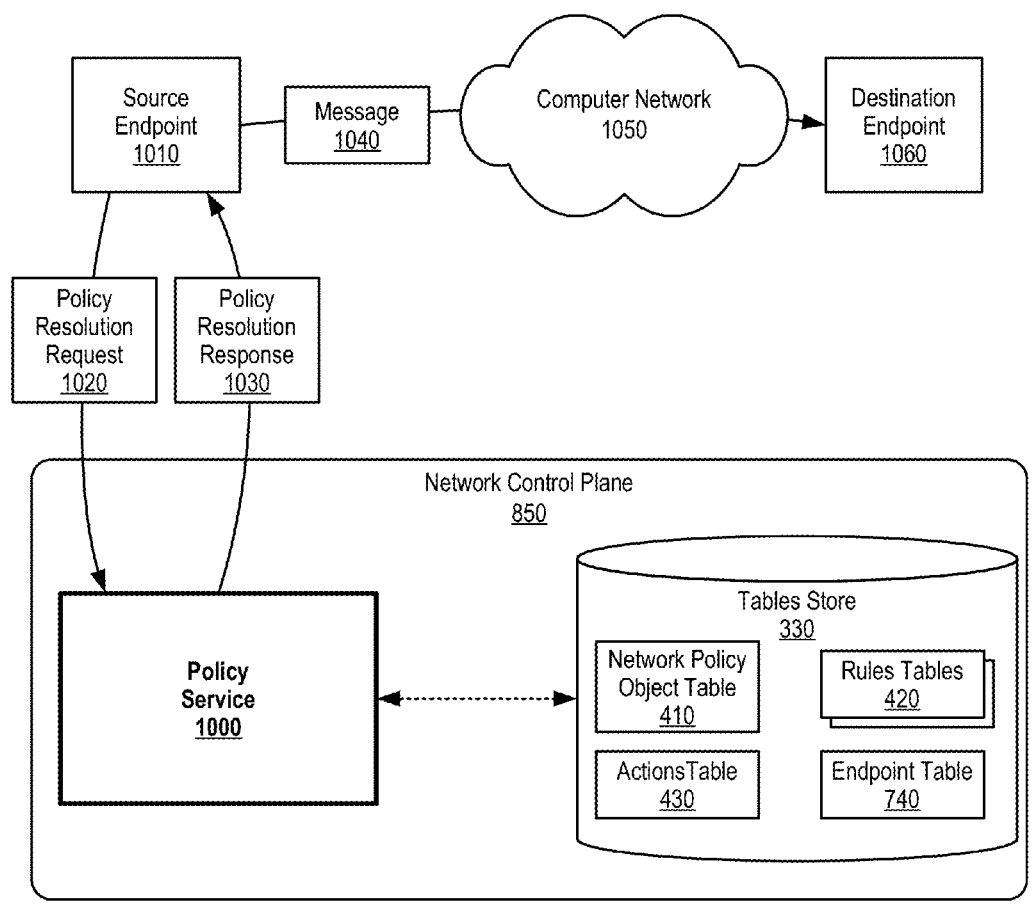
FIG. 10 is a diagram showing a network control plane receiving a policy resolution response and communicating control instructions for the source endpoint to send data to a destination endpoint over a physical network.

FIG. 10 is a diagram showing a network control plane receiving a policy resolution request and communicating control instructions for the source endpoint to send data to a destination endpoint over a physical network. In one embodiment, network control plane 850 includes policy service 1000, which accesses various tables in tables store 330 to provide actions to a data plane entity (see FIG. 12 and corresponding text for further details).

Upon receipt of a resolution request initiated on behalf of the source endpoint 1010 (e.g., a virtual switch), policy service 1000 uses endpoint table 740 to identify destination endpoint 1060's assigned network policy object. Then, using the source network policy object identifier (most specific) extracted from the policy resolution request 1020, policy service 1000 accesses the source network policy object's rules table looks for an entry that includes the destination network policy object identifier. If this entry is not found, policy service 1000 selects a table corresponding to the next higher extension path (e.g., in the case of rules table of Web Service/DMZ/Domain1, the next rules table to search is DMZ/Domain1). As such, the rules table entry at the most specific level is located first (e.g., a rule that overrides a higher level extension).

In turn, policy service 1000 accesses actions table 430 to retrieve an action corresponding to the rule, and includes the action (configuration instruction) in policy resolution response 1030. Policy service 1000 sends policy resolution response 1030 to source endpoint 1010, which follows the action (e.g., SSL, compression, etc.) to send message 1040 over computer network 1050 to destination endpoint 1060.

Figure 11A:
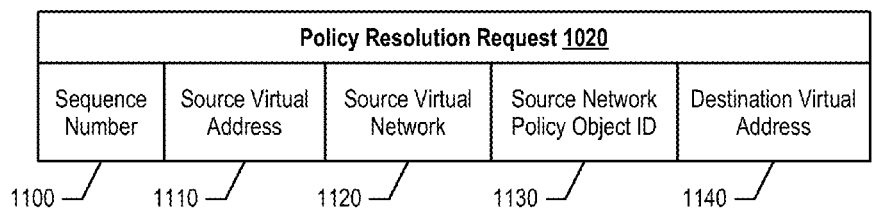
FIG. 11A is a diagram showing an example of a policy resolution request.

FIG. 11A is a diagram showing an example of a policy resolution request. In one embodiment, a data plane entity sends a policy resolution request to a policy service when the source endpoint wishes to send data to a destination endpoint. Policy resolution request 1020 includes fields 1100-1140. As those skilled in the art can appreciate, a policy resolution request may include more or less fields than what is shown in FIG. 11A. Field 1100 includes a request sequence number that the policy service includes in a response to the source endpoint in order for the source endpoint to correlate the response with the corresponding request (see FIG. 11B and corresponding text for further details).

Field 1110 includes a source virtual address that corresponds to the source endpoint, and field 1120 includes a source virtual network corresponding to the source endpoint. Field 1130 includes a network policy object identifier to which the source endpoint is assigned. The policy service uses this information to identify the source network policy object's rules table (see FIG. 11 and corresponding text for further details). Field 1140 includes a destination virtual address, which the policy service maps to a destination network policy object→rules table→action (see FIG. 12 and corresponding text for further details).

Figure 11B:
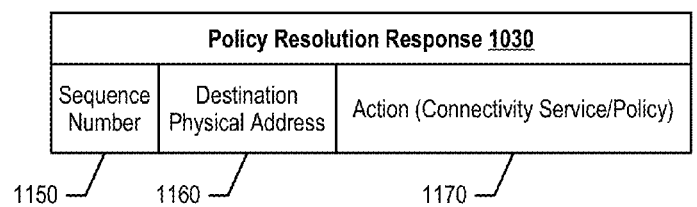
FIG. 11B is a diagram showing an example of a policy resolution response that includes connectivity instructions in the form of actions.

FIG. 11B is a diagram showing an example of a policy resolution response that includes configuration instructions in the form of actions. A policy service sends a policy resolution response to a data plane entity in response to receiving a policy resolution request on behalf of the source endpoint, such as policy resolution request 920 shown in FIG. 11A.

Policy resolution response 1030 includes fields 1150-1170. As those skilled in the art can appreciate, a policy resolution response may include more or less fields than what is shown in FIG. 11B. Field 1150 includes a sequence number that was included in the policy resolution request received at the policy service. This allows the source endpoint to correlate the policy resolution response with its policy resolution request.

Field 1160 includes a destination physical address of the destination endpoint (identified by the policy service based upon the destination virtual address discussed above). Field 1170 includes an action (configuration instruction) that the source endpoint should invoke to send data to the destination endpoint, such as a connectivity service action and/or a policy associated with the connection).

FIG. 12 is a flowchart showing steps taken in resolving a policy resolution request, by accessing information in the control plane and providing control instructions within a policy resolution reply. Processing commences at 1200 (e.g., policy service 900 shown in FIG. 9), whereupon processing receives a policy resolution request, such as policy resolution request 920 shown in FIG. 11A (step 1210). The policy resolution request may be sent from a virtual switch, and includes a source network policy object identifier corresponding to the source's assigned network policy object. The policy resolution request also includes a destination virtual address that identifies a destination endpoint.

At step 1220, processing accesses endpoint table 740 and locates an endpoint entry that includes the destination virtual address included in the policy resolution request. Processing extracts a destination physical address and a destination network policy object from the located endpoint entry, which identifies the destination endpoint's assigned network policy object.

Processing selects a rules table corresponding to the source network policy object at step 1230. In one embodiment, the selected rules table is a rules table specific to the source network policy object. For example, if the source network policy object is D/C/B, then processing first selects the "Rules Table D/C/B." At step 1235, processing searches the selected rules table (included in rules tables 420) for a table entry that matches the destination network policy object. Using the example above and assuming the destination network policy object is Z/Y, processing searches for a Z/Y destination network policy object identifier in the network policy object D/C/B rules table (see FIG. 4 and corresponding text for further details).

A determination is made as to whether a match is found in the selected rules table (decision 1240). If a match is not found, decision 1240 branches to the "No" branch, whereupon a determination is made as to whether the selected rules table is an extension of a higher level rules table (decision 1245). In one embodiment, processing access the selected rules table network policy object extension identifier field (column 424 in FIG. 4) to determine if the recently searched rules table is an extension of another rules table (e.g., the source network policy object is an extension of another network policy object).

If the selected table is not an extension, decision 1245 branches to the "Yes" branch, whereupon processing selects a rules table corresponding to the next higher source path extension, which is "Rules Table C/B" from the example above. This looping continues until processing has searched the highest level rules table and does not find a match, at which point decision 1245 branches to the "No" branch, whereupon processing denies the policy resolution request at step 1255 and processing returns at 1260.

However, when processing identifies a match in one of the selected rules tables, decision 1240 branches to the "Yes" branch, whereupon processing extracts the rule (or rule identifier) from the matched rules table entry (step 1270), and accesses actions table 430 to identify an action that corresponds to the extracted rule (step 1275). The action may be, for example, a specific policy associated with the connectivity (e.g. Quality of service policy). In turn, processing includes the action in a policy resolution response (e.g., policy resolution response 930 shown in FIG. 11B), and sends the policy resolution response to the member at step 1280. Processing returns at 1290.

Figure 13:
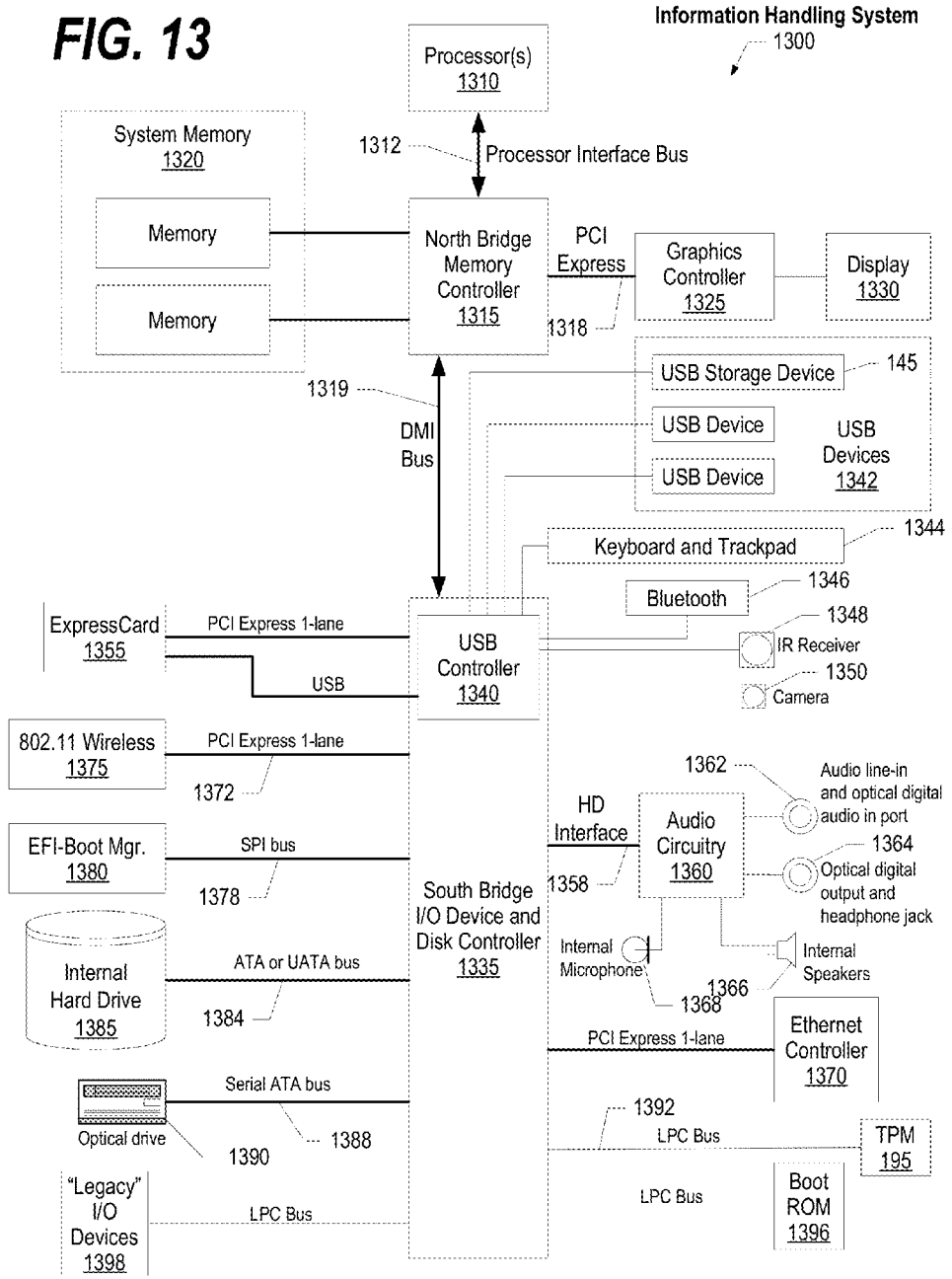
FIG. 13 is a block diagram of a data processing system in which the methods described herein can be implemented.

FIG. 13 illustrates information handling system 1300, which is a simplified example of a computer system capable of performing the computing operations described herein. Information handling system 1300 includes one or more processors 1310 coupled to processor interface bus 1312. Processor interface bus 1312 connects processors 1310 to Northbridge 1315, which is also known as the Memory Controller Hub (MCH). Northbridge 1315 connects to system memory 1320 and provides a means for processor(s) 1310 to access the system memory. Graphics controller 1325 also connects to Northbridge 1315. In one embodiment, PCI Express bus 1318 connects Northbridge 1315 to graphics controller 1325. Graphics controller 1325 connects to display device 1330, such as a computer monitor.

Northbridge 1315 and Southbridge 1335 connect to each other using bus 1319. In one embodiment, the bus is a Direct Media Interface (DMI) bus that transfers data at high speeds in each direction between Northbridge 1315 and Southbridge 1335. In another embodiment, a Peripheral Component Interconnect (PCI) bus connects the Northbridge and the Southbridge. Southbridge 1335, also known as the I/O Controller Hub (ICH) is a chip that generally implements capabilities that operate at slower speeds than the capabilities provided by the Northbridge. Southbridge 1335 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1396 and "legacy" I/O devices (using a "super I/O" chip). The "legacy" I/O devices (1398) can include, for example, serial and parallel ports, keyboard, mouse, and/or a floppy disk controller. The LPC bus also connects Southbridge 1335 to Trusted Platform Module (TPM) 1395. Other components often included in Southbridge 1335 include a Direct Memory Access (DMA) controller, a Programmable Interrupt Controller (PIC), and a storage device controller, which connects Southbridge 1335 to nonvolatile storage device 1385, such as a hard disk drive, using bus 1384.

ExpressCard 1355 is a slot that connects hot-pluggable devices to the information handling system. ExpressCard 1355 supports both PCI Express and USB connectivity as it connects to Southbridge 1335 using both the Universal Serial Bus (USB) the PCI Express bus. Southbridge 1335 includes USB Controller 1340 that provides USB connectivity to devices that connect to the USB. These devices include webcam (camera) 1350, infrared (IR) receiver 1348, keyboard and trackpad 1344, and Bluetooth device 1346, which provides for wireless personal area networks (PANs). USB Controller 1340 also provides USB connectivity to other miscellaneous USB connected devices 1342, such as a mouse, removable nonvolatile storage device 1345, modems, network cards, ISDN connectors, fax, printers, USB hubs, and many other types of USB connected devices. While removable nonvolatile storage device 1345 is shown as a USB-connected device, removable nonvolatile storage device 1345 could be connected using a different interface, such as a Firewire interface, etcetera.

Wireless Local Area Network (LAN) device 1375 connects to Southbridge 1335 via the PCI or PCI Express bus 1372. LAN device 1375 typically implements one of the IEEE 802.11 standards of over-the-air modulation techniques that all use the same protocol to wireless communicate between information handling system 1300 and another computer system or device. Optical storage device 1390 connects to Southbridge 1335 using Serial ATA (SATA) bus 1388. Serial ATA adapters and devices communicate over a high-speed serial link. The Serial ATA bus also connects Southbridge 1335 to other forms of storage devices, such as hard disk drives. Audio circuitry 1360, such as a sound card, connects to Southbridge 1335 via bus 1358. Audio circuitry 1360 also provides functionality such as audio line-in and optical digital audio in port 1362, optical digital output and headphone jack 1364, internal speakers 1366, and internal microphone 1368. Ethernet controller 1370 connects to Southbridge 1335 using a bus, such as the PCI or PCI Express bus. Ethernet controller 1370 connects information handling system 1300 to a computer network, such as a Local Area Network (LAN), the Internet, and other public and private computer networks.

While FIG. 13 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 1395) shown in FIG. 13 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 14.

Figure 14:
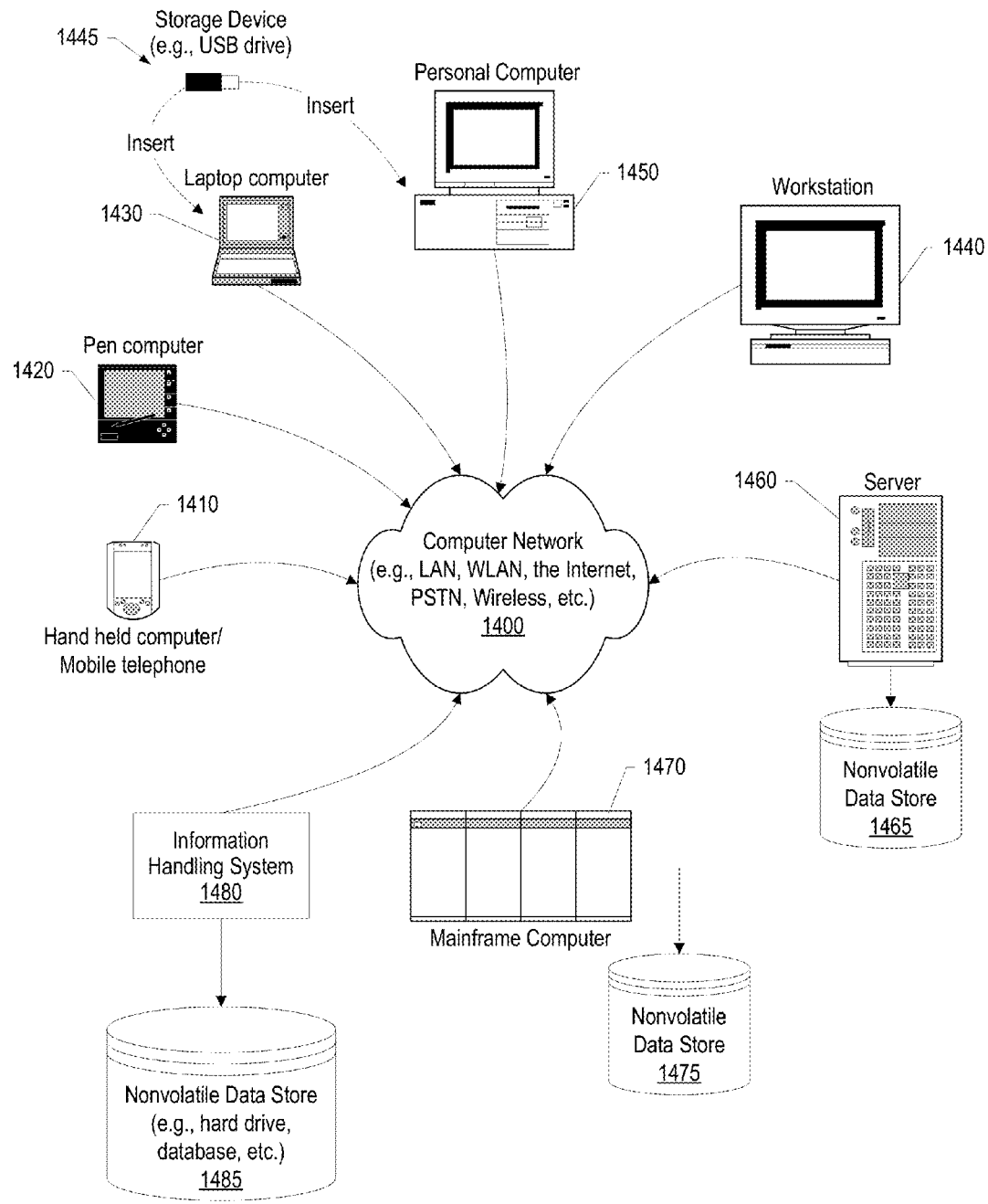
FIG. 14 provides an extension of the information handling system environment shown in FIG. 13 to illustrate that the methods described herein can be performed on a wide variety of information handling systems which operate in a networked environment.

FIG. 14 provides an extension of the information handling system environment shown in FIG. 13 to illustrate that the methods described herein can be performed on a wide variety of information handling systems that operate in a networked environment. Types of information handling systems range from small handheld devices, such as handheld computer/mobile telephone 1410 to large mainframe systems, such as mainframe computer 1470. Examples of handheld computer 1410 include personal digital assistants (PDAs), personal entertainment devices, such as MP3 players, portable televisions, and compact disc players. Other examples of information handling systems include pen, or tablet, computer 1420, laptop, or notebook, computer 1430, workstation 1440, personal computer system 1450, and server 1460. Other types of information handling systems that are not individually shown in FIG. 14 are represented by information handling system 1480. As shown, the various information handling systems can be networked together using computer network 1400. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 14 depicts separate nonvolatile data stores (server 1460 utilizes nonvolatile data store 1465, mainframe computer 1470 utilizes nonvolatile data store 1475, and information handling system 1480 utilizes nonvolatile data store 1485). The nonvolatile data store can be a component that is external to the various information handling systems or can be internal to one of the information handling systems. In addition, removable nonvolatile storage device 1345 can be shared among two or more information handling systems using various techniques, such as connecting the removable nonvolatile storage device 1345 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
defining an object-oriented network modeling language that includes one or more network policy object requirements and one or more language primitives;
creating a plurality of network policy objects based upon the one or more network policy object requirements;
extending a first network policy object to a second network policy object according to one of the language primitives, the first network policy object and the second network policy object included in the plurality of network policy objects;
creating, by one or more processors, a network application model that includes the plurality of network policy objects and a plurality of connection rules corresponding to sending data between a plurality of endpoints assigned to the plurality of network policy objects;
converting, by one or more of the processors, the network application model to network configuration information, the network configuration information linking the plurality of network policy objects to the plurality of connection rules, wherein the converting further comprises:
generating one or more first table entries in a first rules table corresponding to the first network policy object, wherein the first rules table includes one or more first destination network policy object identifiers and one or more first connection rules;
generating one or more second table entries in a second rules table corresponding to the second network policy object, wherein the second rules table includes one or more second destination network policy object identifiers and one or more second connection rules, wherein:
one of the second connection rules overrides one of the first connection rules when the second connection rule's corresponding second destination network policy object identifier matches one of the first connection rule's corresponding first network policy object identifier; and
one of the second connection rules adds to the first connection rules when the second connection rule's corresponding second destination network policy object identifier fails to match one of the first network policy object identifiers;
configuring, by one or more of the processors, a network control plane, based upon the network configuration information, to map the network application model to a physical infrastructure;
receiving a policy resolution request, from a requestor, corresponding to a source endpoint that includes a source network policy object identifier and a destination virtual address;
identifying a destination network policy object identifier that corresponds to the destination virtual address;
determining that the source network policy object identifier corresponds to the second network policy object;
searching the second rules table for the destination network policy object identifier; and
in response to locating the destination network policy object identifier in the second rules table:
extracting one of the second rules from the second rules table corresponding to the located destination network policy object identifier;
identifying an action corresponding to the extracted second rule;
including the action in a policy resolution response; and
sending the policy resolution response the requestor, wherein the requestor re-configures the network control plane according to the policy resolution response.

2. The method of claim 1 further comprising:
in response to failing to locate the destination network policy object identifier in the second rules table:
searching the first rules table for the destination network policy object identifier;
locating the destination network policy object identifier in the first rules table;
extracting one of the first rules from the first rules table that corresponds to the located destination network policy object identifier;
identifying a different action that corresponds to the extracted first rule;
including the different action in a different policy resolution response; and
sending the different policy resolution response to the requestor wherein the requestor re-configures the network control plane according to the different policy resolution response.

3. The method of claim 1 further comprising:
including an extended network policy object identifier in the second rules table that identifies the first network policy object.

4. The method of claim 1 further comprising:
receiving a request to assign an endpoint to one of the plurality of network policy objects;
creating an endpoint entry in an endpoint table, the endpoint entry including an endpoint identifier that identifies the endpoint and a network policy object identifier that identifies the one of the plurality of network policy objects; and
updating the network configuration information in response to assigning the endpoint to the one of the plurality of network policy objects.

5. The method of claim 1 further comprising:
receiving an endpoint lifecycle event, wherein the endpoint lifecycle event is selected from the group consisting of a configuration update, an existing endpoint change, an endpoint migration, and an endpoint removal; and
updating the network configuration information according to the endpoint lifecycle event.

6. The method of claim 1 further comprising:
receiving one or more network application model updates; and
updating the network configuration information according to the received one or more network application model updates.

7. The method of claim 1 wherein the one or more object oriented network language primitives are selected from the group consisting of an override primitive, an extend primitive, and an append primitive.

\* \* \* \* \*